US011433569B2

(12) United States Patent
Hack et al.

(10) Patent No.: US 11,433,569 B2
(45) Date of Patent: Sep. 6, 2022

(54) METHOD FOR OPERATING AN APPARATUS FOR TRANSFORMING PLASTIC PARISONS INTO PLASTIC CONTAINERS, AND APPARATUS

(71) Applicant: KRONES AG, Neutraubling (DE)

(72) Inventors: Andreas Hack, Dingolfing (DE); Florian Geltinger, Donaustauf (DE)

(73) Assignee: KRONES AG

( * ) Notice: Subject to any disclaimer, the term of this patent is extended or adjusted under 35 U.S.C. 154(b) by 318 days.

(21) Appl. No.: 16/611,166

(22) PCT Filed: May 4, 2018

(86) PCT No.: PCT/EP2018/061582
§ 371 (c)(1),
(2) Date: Nov. 5, 2019

(87) PCT Pub. No.: WO2018/202885
PCT Pub. Date: Nov. 8, 2018

(65) Prior Publication Data
US 2020/0189149 A1    Jun. 18, 2020

(30) Foreign Application Priority Data

May 5, 2017    (DE) ..................... 10 2017 109 742.2

(51) Int. Cl.
*B29C 33/28*    (2006.01)
*B29C 49/36*    (2006.01)
(Continued)

(52) U.S. Cl.
CPC .............. *B29C 33/28* (2013.01); *B29C 49/36* (2013.01); *B29C 49/40* (2013.01); *B29C 49/56* (2013.01);
(Continued)

(58) Field of Classification Search
CPC .... B29C 33/28; B29C 49/36; B29C 2049/566
See application file for complete search history.

(56) References Cited

U.S. PATENT DOCUMENTS 8,287,797 B2    10/2012   Voth et al. .................... 264/523
8,708,681 B2    4/2014    Voth et al. .................... 425/73
(Continued)

FOREIGN PATENT DOCUMENTS

DE    102015117273    4/2017    ............ B29C 49/42
EP    2263854         12/2010   ............ B29C 49/42
(Continued)

OTHER PUBLICATIONS

German Search Report (w/machine translation) issued in application No. 10 2017 109 742.2, dated Feb. 28, 2018 (12 pgs).
(Continued)

*Primary Examiner* — Kelly M Gambetta
*Assistant Examiner* — Virak Nguon
(74) *Attorney, Agent, or Firm* — Hayes Soloway P.C.

(57) ABSTRACT

A method and apparatus for operating an apparatus for transforming plastic parisons into plastic containers, wherein the apparatus has a movable carrier, on which a plurality of transforming stations are arranged for transforming plastic parisons into plastic containers. The transforming stations each have at least two mould supports on which blow mould parts are arranged, which blow mould parts are components of a blow mould and form a hollow space within which the plastic parisons can be expanded into the plastic containers by application of a flowable medium. The mould supports are pivotable with respect to one another for opening and closing the blow mould and wherein furthermore the transforming stations have a latching mechanism
(Continued)

which is configured to latch the two mould supports at least at times to one another such that an opening movement of the blow mould is prevented.

18 Claims, 4 Drawing Sheets

(51) Int. Cl.
*B29C 49/40* (2006.01)
*B29C 49/56* (2006.01)
*B29L 31/00* (2006.01)

(52) U.S. Cl.
CPC . *B29C 2049/566* (2013.01); *B29L 2031/7158* (2013.01)

(56) References Cited

U.S. PATENT DOCUMENTS

| | | | |
|---|---|---|---|
| 9,061,459 B2 | 6/2015 | Neubauer et al. | B29C 49/56 |
| 2010/0203185 A1* | 8/2010 | Litzenberg | B29C 49/56 |
| | | | 425/522 |
| 2011/0059197 A1* | 3/2011 | Duclos | B29C 49/56 |
| | | | 425/150 |
| 2012/0161349 A1* | 6/2012 | Pasquier | B29C 49/48 |
| | | | 264/39 |
| 2012/0225158 A1* | 9/2012 | Voth | B29C 49/56 |
| | | | 425/540 |
| 2015/0145180 A1* | 5/2015 | Finger | B29C 49/4205 |
| | | | 264/523 |

FOREIGN PATENT DOCUMENTS

| | | | | |
|---|---|---|---|---|
| EP | 2495086 | 9/2012 | | B29C 49/06 |
| EP | 2511070 | 10/2012 | | B29C 49/46 |

OTHER PUBLICATIONS

International Preliminary Report on Patentability (w/translation) issued in application No. PCT/EP2018/061582, dated Nov. 5, 2019 (15 pgs).

International Search Report and Written Opinion (w/translation) issued in application No. PCT/EP2018/061582, dated Aug. 10, 2018 (18 pgs).

* cited by examiner

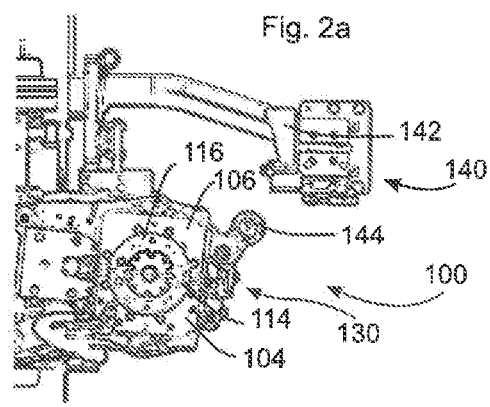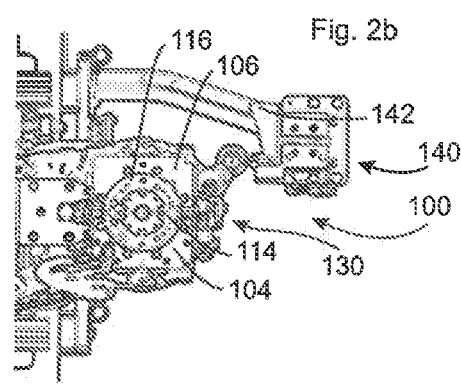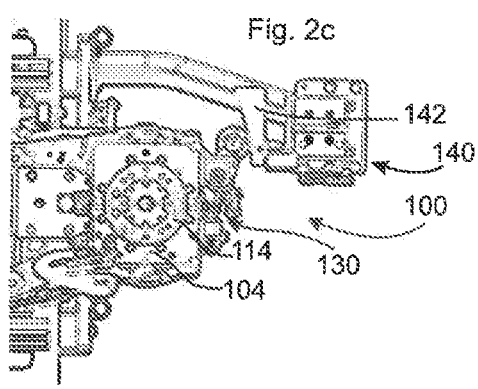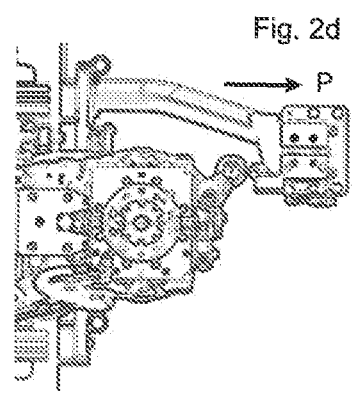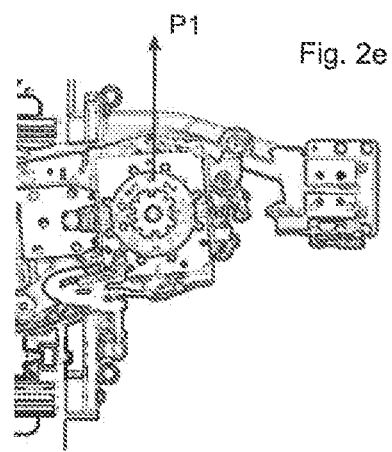

METHOD FOR OPERATING AN APPARATUS FOR TRANSFORMING PLASTIC PARISONS INTO PLASTIC CONTAINERS, AND APPARATUS

BACKGROUND OF THE INVENTION

The present invention relates to an apparatus for transforming plastic parisons into plastic containers and to a method for operating such an apparatus. Such apparatus and methods have been known for a long time from the prior art. In this case heated plastic parisons are usually introduced into blow moulds and inside these blow moulds are expanded by the application of compressed air to produce plastic bottles. For this purpose these apparatus usually have blow moulds which serve to form the corresponding plastic bottles.

If the system is to be switched to different containers, it is necessary to remove the blow moulds or also the individual parts thereof from mould supports and to replace them by other blow moulds. In this case it is usual in the prior art for the individual blow mould parts to be changed manually. Various methods and apparatus which carry out such a changing operation are also known from the prior art. Thus a method is known from the internal prior art of the applicant in which first of all latching between the mould supports is released and then the mould supports are opened, the moulds are changed, the mould supports are closed again and also the latching is closed again. However, this usually takes place in different positions of a blow moulding wheel.

Thus the present invention relates in particular to a method for carrying out a change of blow mould in a blow moulding machine.

The object of the present invention is to enable a time saving for such a blow mould changing operation.

SUMMARY OF THE INVENTION

In a method according to the invention for operating an apparatus for transforming plastic parisons into plastic containers (and in particular a method for carrying out a change of blow mould for an apparatus for transforming plastic parisons into plastic containers) this apparatus has a movable and in particular rotatable carrier, on which a plurality of transforming stations for transforming plastic parisons into plastic containers are arranged. In this case these transforming stations each have at least two mould supports, on which—at least indirectly—blow mould parts are arranged, wherein these blow mould parts are components of a blow mould and form a hollow space within which the plastic parisons can be expanded into the plastic containers by application of a flowable medium (and in particular with compressed air) and wherein these two mould supports are pivotable with respect to one another for opening or closing the blow mould, and wherein furthermore the transforming station has a latching mechanism which is suitable and intended to latch and/or to unlatch the two mould supports at least at times with respect to one another, wherein furthermore a changing operation of the apparatus is provided, in which at least components of the blow mould are changed and furthermore a first actuating device is provided to effect an unlatching and/or latching of the latching mechanism. Furthermore, a second actuating device is provided which brings the mould support or supports into an open and/or closed position (and/or brings the mould support from an open position into a closed position or from a closed position into an open position).

According to the invention at least one of the operations initiated and/or effected and/or carried out by at least one of the actuating devices is initiated and/or effected and/or carried out by rotary movement of the carrier relative to the (respective) actuating device.

Thus the aforementioned operations are in particular the unlatching or latching of the mould support and/or the opening and/or closing of the mould support (and/or of the two mould supports). Preferably an opening of the blow mould is prevented in a latched state of the latching mechanism and is made possible in an unlatched state of the latching mechanism.

The operations are preferably pivoting movements and/or these operations preferably include pivoting movements.

More precisely, the said operations are preferably carried out by a rotary movement of the carrer (also designated as a blow moulding wheel) relative to the actuating device or devices, wherein this rotary movement is in particular a rotary movement of the carrier relative to the (stationary) environment.

In a further preferred method the respective other one of the said operations is initiated, effected and/or carried out. Thus it would be possible that latching and/or unlatching of the blow mould supports takes place during and/or through a movement of the carrier (blow moulding wheel) and opening and/or closing of the mould supports takes place during a shutdown of the carrier (blow moulding wheel). Conversely it would be possible that latching and/or unlatching of the blow mould supports takes place during a shutdown of the carrier (blow moulding wheel) and opening and/or closing of the mould supports takes place during a movement of the carrier (blow moulding wheel).

In the internal prior art in the name of the applicant it is in some instances usual that the latching mechanism is opened by advancing of the actuating mechanism or of an element of the actuating mechanism. On the other hand, within the context of the invention to some extent a passive unlatching is proposed, which takes place by a movement of the reshaping station, for example relative to a guide cam. Thus in particular the transforming station itself moves (relative to the environment) and not only with respect to the actuating device.

Thus the unlatching preferably takes place here by the individual transforming stations running past a guide cam and thus a movement of the transforming station which is in any case necessary or present can be used in order to achieve unlatching and, possibly also later, latching of the mould supports. In other words, instead of an active unlatching or latching, in particular concurrently with the opening of the mould support, a passive unlatching or latching of the mould support is provided, and preferably also a subsequent opening and closing of the mould support. In this way a saving of time relative to the active unlatching or latching is made possible, since the unlatching or latching can occur concurrently with the movement of the blow moulding station in particular into a change position or also concurrently with leaving this change position.

Thus it is possible for example that, instead of using an actively controlled cam for unlatching or latching of the mould support, the unlatching and latching cam is moved out before the automatic change of blow mould for example by means of a robot.

In this case it is possible that the blow mould part, which is in particular a side part of the blow mould, is arranged directly on the side part support. However, it would also be possible and preferable that the side part is arranged on the side part support by means of a support shell.

In a preferred method the transforming station is transported into a change position, and in this change position at least components of the blow mould are changed. In addition to the replacement of the components, other operations can also be carried out, such as for example a separation of media connections, for instance for liquid temperature regulation media, which serve for regulating the temperature of the blow mould parts.

In this case the transforming station is preferably moved by a movement of the carrier, and in particular a rotary movement of the carrier, and the latching mechanism is preferably unlatched by this movement. Therefore the unlatching preferably takes place during a movement of the transforming station and/or during a rotary movement of the carrier on which the individual transforming stations are arranged.

In a further preferred method the first actuating device and/or the actuating element (which, as mentioned above, may in particular be a segment of a cam) is advanced before or during a changing operation into the movement path of the cam roller, in such a way that the latching mechanism is latched and/or unlatched by a rotary movement of the carrier or blow moulding wheel relative to the actuating device.

Subsequently it is possible that in a stationary position of the carrier or blow moulding wheel, the mould supports are opened in particular by means of a further actuating mechanism.

In a particularly preferred method the actuating element and/or cam piece of the first actuating device is advanced pneumatically into the movement path of the cam roller. Therefore a pneumatic drive device is preferably provided, which is suitable and intended to effect a movement of the actuating element. Instead of a pneumatic driving device, however, electrical, electric motor-powered, magnetic or hydraulic drives would also be conceivable.

In a further advantageous method the second actuating device and/or the second actuating element (which likewise may be a cam piece) is in engagement together with the cam roller at least at times and preferably continuously during the changing operation and is brought into a position which corresponds to an at least partially open position and preferably the open position of the mould support.

In a further advantageous method the second actuating device or the second actuating element is in engagement together with the cam roller and can preferably assume a second position which corresponds to a closed position of the mould support.

In a further advantageous method the open position of the mould support corresponds to a position (of the transforming station) in which the blow moulding wheel or the carrier is stationary.

Particularly preferably, the positioning of the actuating device and/or of an actuating element of this actuating device is driven pneumatically from the first position into the second position and vice versa. Alternatively, however, electric motor-powered, hydraulic or magnetic drives would also be conceivable here.

In a further advantageous method the changing of the blow moulds is carried out by a semi-automatic, preferably fully automatic mould change robot and/or handling manipulator.

In this case it is possible that this latching mechanism has a pivotable element which can engage behind a further latching element. Thus for example a first component of the latching mechanism can be arranged on one of the two mould supports and a second element of the latching mechanism can be arranged on the other mould support. One of these two elements is preferably pivotable relative to the other for latching and unlatching of the latching mechanism. In this case this pivoting movement can be achieved by a cam roller.

In the prior art the transforming station is usually moved into a change position and brought to a standstill. After this positioning an unlatching or latching cam can move out and can unlatch the latching mechanism or the mould support. Then the mould support is opened, a blow mould set is changed and the mould support is closed again. The mould support is latched again by the unlatching and latching cam moving in.

Within the context of the invention it is possible that an actuating element, such as for example an unlatching or latching cam, is moved out before the blow moulding station is moved into a change position. In the change mode, a roller mounted on the latching flap moves along on the unlatching or latching cam. Thus it is possible that due to a specific shape of the unlatching or latching cam the latching flap is opened and closed again while the blow moulding station is moving past.

Thus the difference between the present inventions and the prior art hitherto is that the mould support can be unlatched or latched while it is passing an unlatching or latching cam and not only during a shutdown of the machine.

In a further advantageous method the latching mechanism is unlatched before it reaches (or as it reaches) the change position. Upon reaching the change position the mould supports with the blow mould parts arranged thereon can then be opened.

In a further preferred method this actuating device has an actuating element which is movable between a first position and a second position, wherein in at least one of the two positions this actuating element effects an unlatching of the latching mechanism by mechanical contact with at least one element of the transforming station. This may be for example a latching or unlatching cam, which for the changing operation is advanced into a specific position in which it is capable of effecting the unlatching or releasing the latching.

In a further preferred method, latching of the latching mechanism can be effected again by a further movement of the transforming station. Thus it is possible that the transforming station is moved into a change position and in this position the blow mould parts are replaced. After a change has taken place the transforming station can be moved or driven further in the previous direction of movement and as a result the latching device can be latched again. In a preferred method first of all an actuating element is moved out in a specific position. This can take place for example by means of a robot. A first reshaping station then moves into its change position. While approaching this change position a roller can move on a latching flap over an unlatching or latching cam and thus the latching flap is opened until the change position is reached.

The transforming station is precisely positioned at the change position in particular by means of an actuating device, and particularly preferably is also supplied with compressed air.

In a further method step the mould support or the mould supports can be opened, which can also take place in particular with an actuating device. In an opened state the blow mould set can be changed and in particular can be changed with the aid of a robot. Then the mould supports can be closed again. In a further method the transforming station again leaves the said change position. In this case it is possible that a roller on the latching flap of the mould support again travels along the element, in particular the unlatching or latching cam and the mould supports are latched again as a result. In this case it is possible that the latching mechanism is biased so that it moves into or is located in a closed state without external forces. During the entire time in which the latching is opened, the control roller preferably remains guided on or in the cam of the actuating element for opening and closing the mould support. In this way it can be ensured that inadvertent opening of the mould support does not occur.

Since this process would be carried out for all transforming stations in which the blow mould is to be changed, it is possible to move the actuating element, for example an unlatching or latching cam, back again or to move it in.

In a further advantageous method the transforming station moves into a change position, that is to say the position in which the blow mould can be replaced. During this movement in, the blow mould is unlatched by means of the guide cam or the above-mentioned actuating element. In this case, as already mentioned above, this guide cam is moved out and/or is brought into an operating position before the first transforming station moves into the change position. The actuating element preferably remains in this operating position or this moved-out state until the blow moulds of all transforming stations are changed.

In a further method step the relevant transforming station is centred or precisely positioned. Furthermore, the transforming station is supplied with air. For this purpose for example a centring element can move into an element of the transforming station. In a further method step the blow mould supports are opened and the blow mould is removed (in particular by means of a changing device such as a changing robot). Then a new blow mould is inserted and the mould supports are closed again.

In a further method step the centring device moves out of the transforming station. Now the blow moulding wheel or the carrier rotates further and thus the transforming station again moves away from the change position. The blow mould supports are preferably latched to one another again by this movement.

Furthermore, the present invention is directed to an apparatus for transforming plastic parisons into plastic containers (and in particular plastic bottles), wherein the apparatus has a movable and in particular a rotatable carrier, on which a plurality of transforming stations are arranged for transforming plastic parisons into plastic containers, and these transforming stations each have at least two mould supports on which blow mould parts are arranged. In this case these blow mould parts are components of a blow mould and form a hollow space within which the plastic parisons can be expanded into the plastic containers by application of a flowable medium. Furthermore, these two mould supports are pivotable with respect to one another for opening or closing the blow mould, and furthermore the transforming stations have a latching mechanism which is suitable and intended to latch the two mould supports at least at times to one another in such a way that an opening movement of the blow mould is prevented.

Furthermore, a changing operation of the apparatus is provided, in which at least components of the blow mould are changed. In addition, an actuating device is also provided which, before or while a changing operation is carried out, effects a latching and/or unlatching of the latching mechanism in such a way that the blow mould can be opened. Furthermore, a second actuating device is provided which brings the mould support into an open and/or closed position.

According to the invention in a changing operation of the apparatus the latching mechanism can be latched and/or unlatched by a movement of the transforming station relative to the actuating device and/or the mould support can be brought into an open and/or closed position by a movement of the transforming station relative to the actuating device.

It is therefore also proposed with regard to the apparatus that the unlatching and/or the opening or closing of the mould support takes place by a movement and in particular an active movement of the transforming stations. In this case this movement is in particular a movement of the carrier or of the blow moulding wheel on which the individual transforming stations are arranged. Thus in each case the transforming stations are moved, in order to achieve unlatching of the latching mechanism.

The respective other one of the aforementioned operations can preferably be carried out during a shutdown of the carrier or blow moulding wheel.

In a preferred embodiment the actuating device has an actuating element which effects an unlatching of the latching mechanism by mechanical contact with at least one element of the transforming station. The element of the transforming station is advantageously a guide roller which is suitable and intended to roll away relative to the unlatching element. Accordingly, the unlatching element can be a guide cam.

In a preferred embodiment this actuating element can be moved between two positions. Thus a position may be a neutral position in which a corresponding latching or unlatching of the transforming station is not possible and an active position can be produced in which both unlatching and also latching of the transforming stations is possible.

In a further advantageous embodiment, in or after the changing operation of the apparatus the latching mechanism can be latched again by a further movement of the transforming station relative to the actuating device. As stated above, in the change position a change of the blow moulds can be undertaken and after the change of blow mould is carried out the latching mechanism can be latched again by a further movement of the transforming device.

In a further preferred method, the actuating element is configured in such a way that it also effects latching of the latching mechanism by a mechanical contact with the element of the transforming station.

In a preferred embodiment the latching mechanism has a spring element which forces this latching mechanism into a latched state. Thus the actuating element can preferably be configured in particular in the form of a guide cam so that it also latches the cam roller again.

In addition, further guide cams can also be provided which serve for opening and closing the blow mould. However, it would also be possible that opening and closing of the blow mould takes place after unlatching by a changing robot.

In a further advantageous embodiment the apparatus has a changing device and in particular a changing robot which is suitable and intended for demounting blow mould parts from the blow mould support parts. In this case this changing robot in particular can also be suitable and intended for severing media connections, for example connections for cooling media, which serve for cooling the blow mould parts.

The changing device or the changing robot is also preferably suitable and intended for arranging other blow mould elements on the blow mould supports. Such a change of the blow mould parts preferably takes place in a specific change position. In this case a positioning device can be provided which holds the transforming station in a precisely predetermined position or moves it into this position.

Furthermore, the changing device preferably has a gripping element in order to grip the blow mould. In this case the blow mould can be removed in its entirety from a blow mould support or the blow mould support parts.

A blow mould can preferably also be inserted in its entirety into the transforming stations.

In a further advantageous embodiment the blow mould also has a base part. This base part together with the two side parts form the hollow space within which the plastic parisons can be expanded to form the plastic containers.

In a further advantageous embodiment the changing device or the changing robot also undertakes opening and/or closing of the blow mould.

The actuating device preferably has an actuating element and this has along its surface different portions which serve for opening and closing the latching mechanism.

BRIEF DESCRIPTION OF THE DRAWINGS

Advantages and expedient features can be seen in the following description in conjunction with the drawings. In the drawings:

FIGS. 2a-2e show a representation of a sequence for unlatching the blow mould support according to the internal prior art in the name of the applicant;

DETAILED DESCRIPTION OF THE INVENTION

Figure 1A:
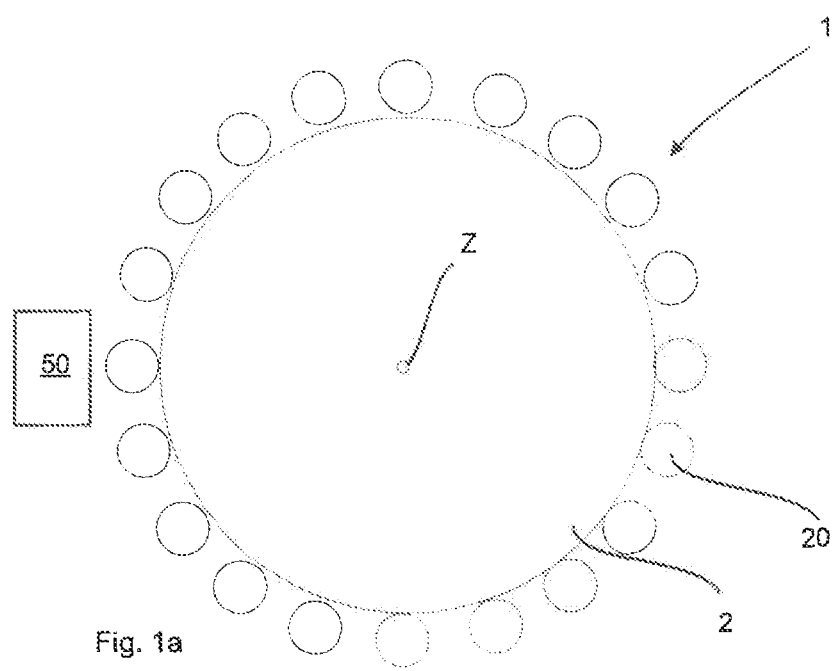
FIG. 1a shows a rough schematic representation of an apparatus according to the invention for transforming plastic parisons into plastic containers.

FIG. 1a shows a schematic representation of an apparatus 1 according to the invention for transforming plastic parisons into plastic containers. In this case this apparatus has a rotatable carrier 2 on which a plurality of transforming stations 20 are arranged. These transforming stations 20 in each case have blow moulds (not shown) which serve for producing the plastic containers. The reference numeral 50 quite schematically designates a changing device, such as in particular a changing robot, which is suitable and intended for replacing blow moulds. In this case this changing robot may in particular also be suitable and intended to change the blow moulds in their entirety, but also to replace only components of the individual blow moulds, such as for instance the side parts.

Furthermore, the apparatus according to the invention can have a clean room (not shown) which surrounds the plastic parisons during the transforming operation. In this case this clean room can be formed for example like a channel.

Figure 1B:
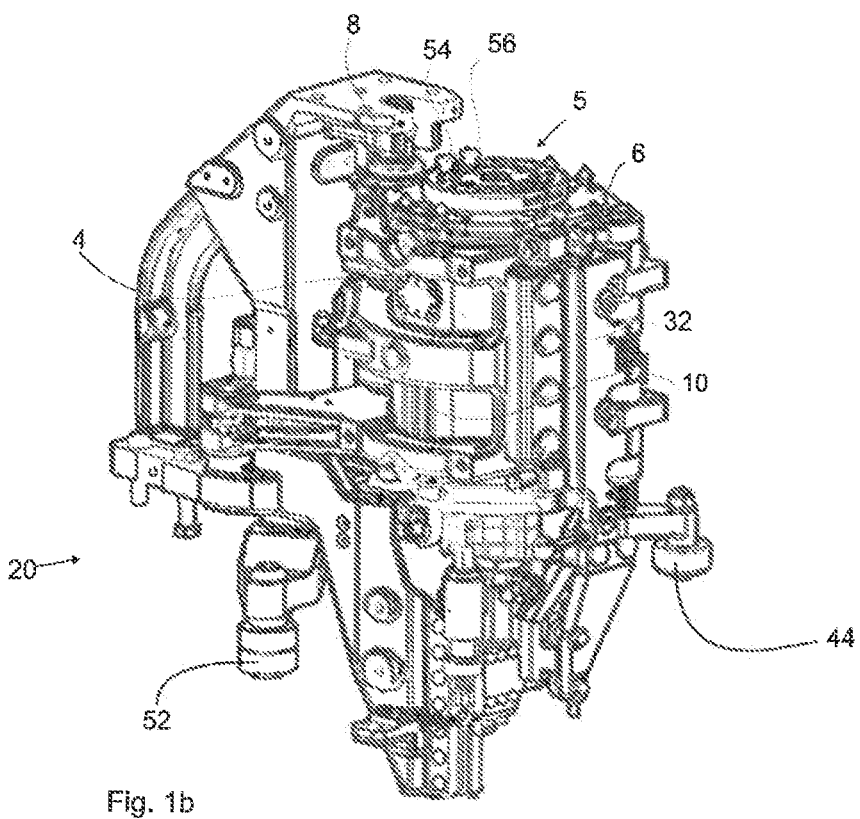
FIG. 1b shows a representation of a transforming station.

FIG. 1b shows a representation of a transforming station 20. This transforming station 20 has a first side part support and a second side part support 6. The reference 10 designates the blow mould in its entirety, which is arranged on the blow mould supports either directly or indirectly by means of blow mould support shells. In this case this blow mould 10 has two side parts, wherein one side part is arranged on the blow mould support 4 and the second side part is arranged on the blow mould support 6. The references 54 and 56 designate projections which are suitable and intended to be gripped by a changing device, such as for instance a robot, in order to be able thus to transport the blow mould itself.

The reference 8 designates a pivot shaft which serves for pivoting the blow mould supports 4 and 6. Opening and closing the blow mould can be achieved by means of this pivot shaft, in that at least one of the two blow mould supports 4, 6 is pivoted with respect to the other blow mould support 6, 4.

The reference numeral 52 designates a cam roller which serves for actuating this pivot mechanism. In this case a guide cam (not shown) may be present, which effects the opening and closing of the blow moulds in this way.

The reference numeral 30 designates in its entirety a latching mechanism which is suitable and intended for latching the blow mould supports 4 and 6 to one another in particular in an operating mode. The reference numeral 44 designates a further cam roller which serves for unlatching and latching this latching mechanism. In this case for example a latching element 32 can be pivoted in order thus to be brought into engagement with or disengaged from a second latching element 34. A pivot axis with respect to which the latching element 32 is pivotable is preferably parallel to the pivot axis, with respect to which at least one of the two blow mould supports is pivotable.

FIGS. 2a to 2e show a method according to the internal prior art in the name of the applicant. In this case in all the drawings the reference numerals 104 and 106 relate to blow mould support parts and the reference numerals 114 and 116 relate to blow mould parts which are arranged at least directly on these blow mould support parts. The reference 130 designates a latching mechanism which serves for latching the two blow mould supports 104 and 106. For this purpose a cam roller 144 is provided by actuation of which a latching can be overridden or unlatched.

The reference numeral 140 designates an actuating device which serves for actuation of this latching mechanism 130. In this case this actuating device has an actuating element 142 which can co-operate with the cam roller 144 for unlatching the latching mechanism 130.

In the situation illustrated in FIG. 2a the transforming station 100 which is still latched moves into a change position. In the situation shown in FIG. 2b the transforming station 100 has reached the said change position. In this position the transforming station can be precisely positioned. The actuating device 140 is now shifted, which can take place for example by supplying compressed air. In the situation shown in FIG. 2c an actuating element 142 is shifted and as a result the latching mechanism 130 is also released by co-operation with the cam roller 144. Thus in this procedure an active latching is provided by the actuating device. In this position the blow mould supports can now be opened and the blow mould parts can be demounted and replaced by new blow mould parts. Then the blow mould is closed again. In a further method step the actuating element 142 is moved back again (arrow P, FIG. 2d) and in this way the mould supports are latched with one another again. In this case this latching of the mould supports can take place concurrently with closing of the mould supports. In this situation the latching cam or the actuating element 142 moves in.

After the change has take place the transforming station 100 moves out of the change position and preferably a further transforming station is moved into the change position (arrow P1, FIG. 2e) shown in the drawings, wherein the procedure described here is then repeated for changing of the blow moulds.

FIGS. 3a to 3f show the procedure according to the invention. Here too the reference numerals 4 and 6 relate to blow mould supports and the reference numerals 14 and 16 relate to side parts of the blow mould. The reference numeral 30 again designates the latching device or the latching mechanism and the reference numeral 44 designates a cam roller which serves for unlatching or latching of the latching device 30. The reference numeral 40 designates in its entirety the actuating device with the actuating element 142.

Figure 3A:
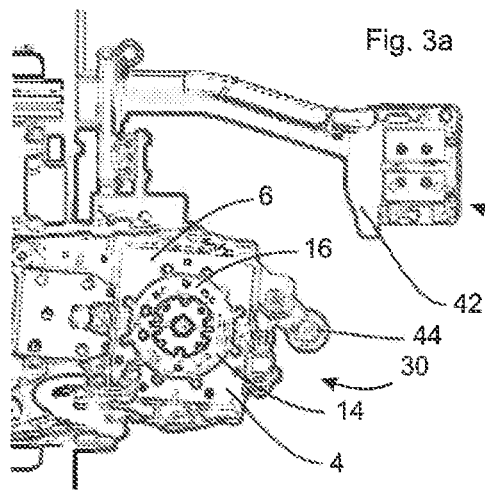
FIGS. 3a-3f show six representations for illustrating a sequence according to the invention.

In the situation shown in FIG. 3a a transforming station 20 which is still latched is shown. In this situation an actuating element 42 is also still moved back and thus is not yet capable here of actuating the latching mechanism.

Figure 3B:
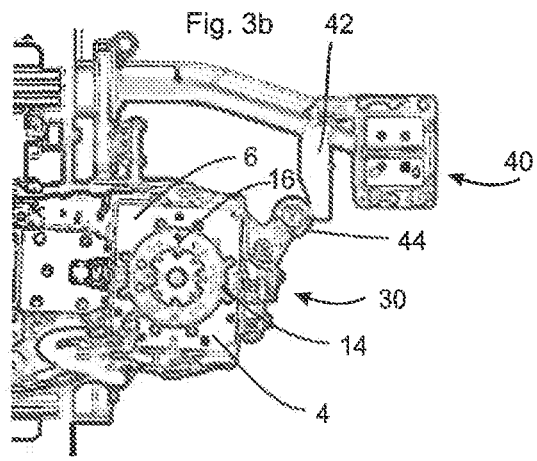

In the situation shown in FIG. 3b the actuating element 42 is advanced towards the left and thus is brought into a position in which an unlatching of the latching mechanism 30 by the actuating element 42 is possible. It will be recognised that in the situation shown in FIG. 3b the cam roller 44 is just beginning to run onto the actuating element 42.

Figure 3C:
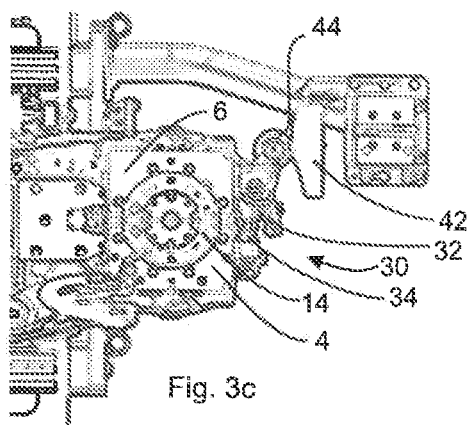

In the situation shown in FIG. 3c, due to a movement of the transforming station 20 the cam roller 44 rolls away relative to the actuating element 42 and in this way due to the design of the actuating element 42 an opening of the latching mechanism 30 is achieved. The transforming station can now remain in this situation and a changing robot can replace the blow mould or the parts 14 and 16 of the blow mould.

In this situation the blow mould supports are pivoted apart and the blow mould can be removed and can be replaced by another blow mould. This preferably takes place, as mentioned above, with the use of a changing device or a robot. After the insertion of a new blow mould the blow mould supports are being pivoted together again.

Figure 3D:
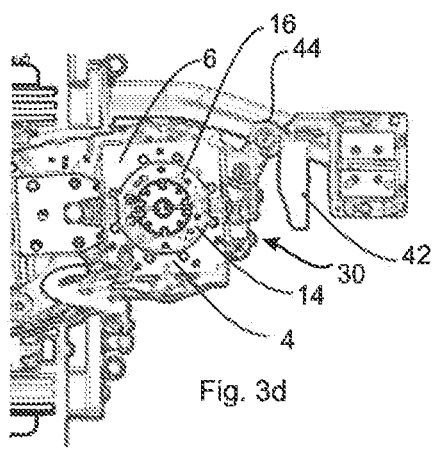

After a change of the blow mould has been carried out, the transforming station is moved further, as shown in FIG. 3d, and due to the design of the actuating element the latch 30 or the latching mechanism 30 is again brought into engagement or into a latched position. It is pointed out that this step could also take place during a shutdown of the apparatus, in that the actuating element 42 is already moved back at this time. Preferably, however, the latching is also effected again by a movement of the transforming station.

Figure 3E:
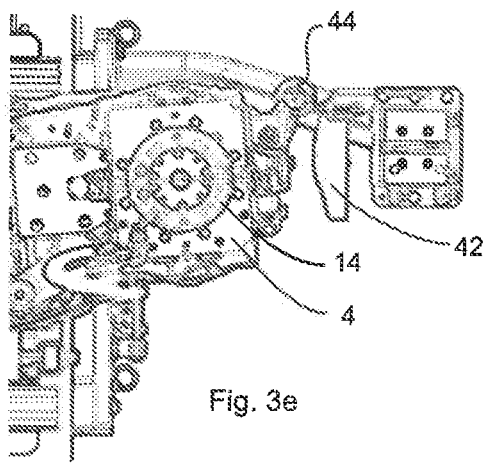

In the situation shown in FIG. 3e the transforming station has now completely left the actuating element 42 and s moved further with the new or changed blow mould parts. At this point the process can be repeated with a further transforming station.

Figure 3F:
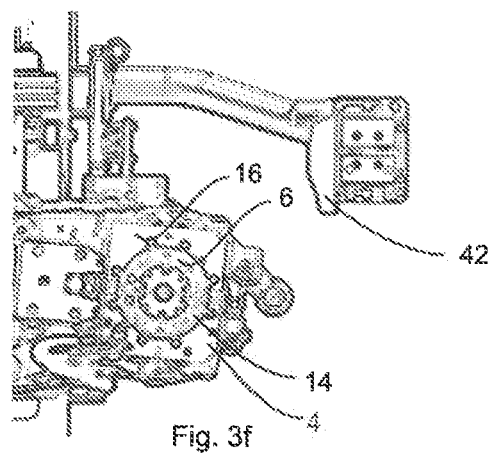

Finally, in the situation shown in FIG. 3f the actuating element 42 is moved back again into the inactive position.

Figure 4:
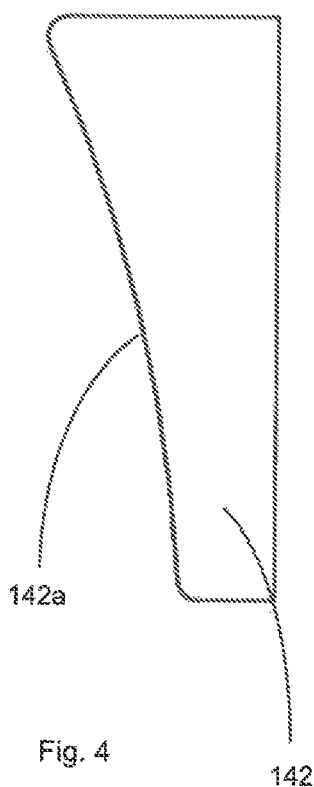
FIG. 4 shows a representation of an actuating element according to the prior art.

FIG. 4 shows an actuating element 142 according to the internal prior art in the name of the applicant. This actuating element 142 has a surface 142a which can roll relative to the cam roller 4. It will be recognised that the surface 142a has a continuous configuration, so that in the event of a relative movement of the transforming station the cam roller is also continuously pushed in a specific direction.

Figure 5:
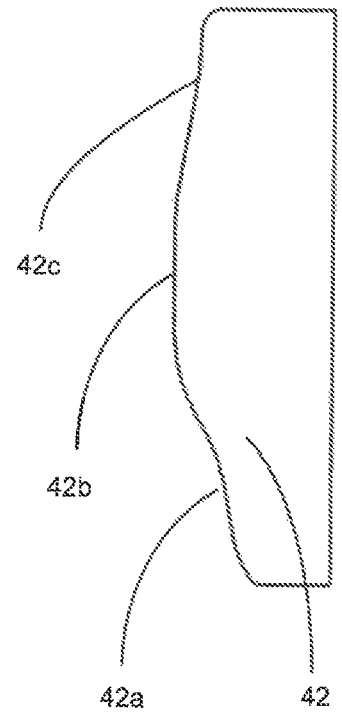
FIG. 5 shows a representation of an actuating element according to the invention.

FIG. 5 shows an actuating element 42 according to the invention. Here too, a surface portion 42a is provided, which serves to push the cam roller in a specific direction (in order to unlatch the latching mechanism). This portion 42a adjoins a portion 42b, in which a position of the cam roller is not changed. In this position the cam roller is held in a specific position and thus the latching mechanism 30 is also held in a specific position, in this case an open position.

The reference numeral 42c designates a third portion of the actuating element 42 with a reverse gradient relative to the portion 42a. Thus in this portion the cam roller is moved back again and thus the latching mechanism can also be latched again. In this case it would be possible that the actuating element has a guide groove (not shown), within which a guide roller can run. However, it would also be possible that the latching element of the latching device is biased by a spring and thus, solely due to the configuration of the surface 42c, it becomes possible for it to be moved back and thus to bring about a latched state of the blow mould support again.

Figure 6:
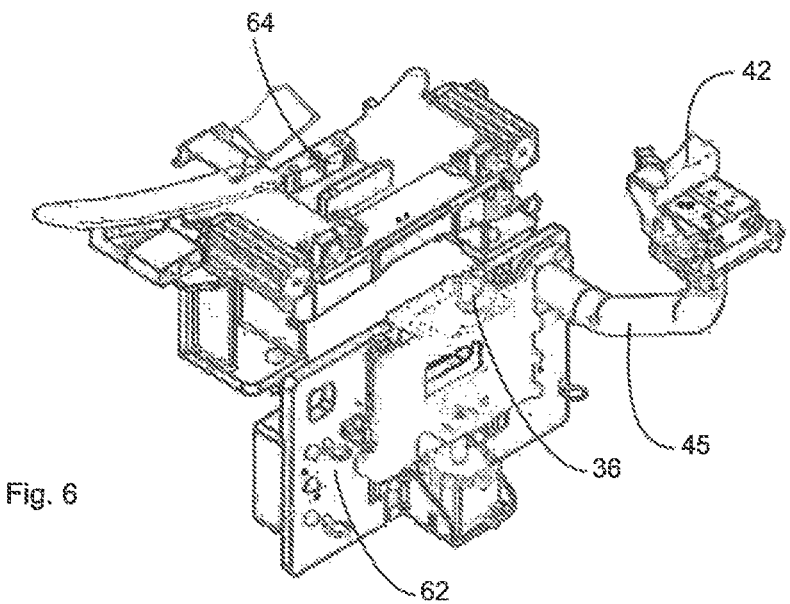
FIG. 6 shows a further partial view of an apparatus according to the invention.

FIG. 6 shows a transforming device according to the invention (without transforming station) in the region of the change position. This also again shows the actuating device 40 which is arranged on an arm 45. The reference 36 designates a centring device, which is suitable and intended to keep the transforming station at a specific position or to bring the transforming station to a precisely defined position, in which a changing operation can be carried out. This centring arrangement is formed here as a vertically movable centring pin or centring bolt, which can move into a corresponding cutout in the transforming station (not shown). The reference 62 designates a platform onto which a changing robot (not shown) can move in order to carry out a change of blow mould. The reference numeral 64 designates a second actuating device which serves for opening and/or closing the blow mould supports. In this case this second actuating device can likewise co-operate with a cam roller of the transforming station.

The applicant reserves the right to claim all the features disclosed in the application documents as essential to the invention in so far as they are individually or in combination novel over the prior art. Furthermore it is pointed out that features which may be advantageous per se have also been described in the individual drawings. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCES 1 apparatus
2 carrier
4 blow mould support, side part support
6 blow mould support, side part support
8 pivot shaft
10 blow mould
14 side part of the blow mould
16 side part of the blow mould
20 transforming station
30 latching mechanism
32 latching element
36 centring device
34 second latching element
40 first actuating device
42 actuating element
44 cam roller
45 arm 50 changing device
52 cam roller
54 projection
56 projection
62 platform
64 second actuating device
100 transforming station
104 blow mould support part
106 blow mould support part
114 blow mould parts
116 blow mould parts
130 latching mechanism
140 actuating device
142 actuating element
144 cam roller
142a surface of the actuating element
42a surface portion of the actuating element
42b second portion of the actuating element
42c third portion of the actuating element
Z axis of rotation
P arrow
P1 arrow

The invention claimed is:

1. A method for operating an apparatus for transforming plastic parisons into plastic containers, wherein the apparatus has a movable carrier, on which a plurality of transforming stations are arranged for transforming plastic parisons into plastic containers, and these transforming stations each have at least two mould supports on which blow mould parts are arranged, wherein these blow mould parts are components of a blow mould and form a hollow space within which the plastic parisons can be expanded into the plastic containers by application of a flowable medium and wherein these two mould supports are pivotable with respect to one another for opening and closing the blow mould and wherein furthermore the transforming stations have a latching mechanism which is configured to latch the two mould supports at least at times to one another in such a way that an opening movement of the blow mould is prevented, wherein a changing operation of the apparatus is provided, in which at least components of the blow mould are changed and a first actuating device is provided, which effects an unlatching and/or latching of the latching mechanism, and a second actuating device is provided which brings the mould support into an open and/or closed position, wherein at least one of the operations initiated and/or carried out by the actuating devices is initiated and/or carried out by a rotary movement of the carrier relative to the actuating device, and wherein at least one of the operations initiated and/or carried out by the actuating devices is initiated and/or carried out during a shutdown of the carrier.

2. The method according to claim 1, wherein the transforming station is transported into a change position, and in this change position at least components of the blow mould are changed.

3. The method according to claim 2, wherein the latching mechanism is unlatched before the change position is reached.

4. The method according to claim 1, wherein the blow mould support includes a first cam roller, wherein first actuating device is advanced before or during a changing operation into the movement path of the first cam roller, in such a way that the latching mechanism is latched and/or unlatched by a rotary movement of the carrier relative to the actuating device.

5. The method according to claim 4, wherein the first actuating device includes a cam piece configured to be advanced pneumatically into movement path of the first cam roller.

6. The method according to claim, wherein the blow mould support includes a second cam roller, wherein during the changing operation the second actuating device is in engagement together with the second cam roller and is brought into a first position which corresponds to the open position of the mould support.

7. The method according to claim 6, wherein the second actuating device is in engagement together with the second cam roller and can assume a second position which corresponds to a closed position of the mould support.

8. The method according to claim 7, wherein the positioning of the second-actuating device is driven pneumatically from the latching/unlatching position and vice versa.

9. The method according to claim 1, wherein the open position of the mould support corresponds to a position in which the moveable carrier is stationary.

10. The method according to claim 1, wherein the transforming station is moved by a movement of the carrier and at least the latching mechanism is unlatched by this movement.

11. The method according to claim 1, wherein the actuating device has an actuating element which is movable between a first position and a second position, wherein in at least one of the two positions this actuating element effects an unlatching of the latching mechanism by mechanical contact with at least one element of the transforming station.

12. The method according to claim 1, wherein latching of the latching mechanism is effected again by a further movement of the transforming station.

13. The method according to claim 1, wherein the changing of the blow moulds is carried out by a semi-automatic or fully automatic mould change robot and/or handling manipulator.

14. An apparatus for transforming plastic parisons into plastic containers, wherein the apparatus has a movable carrier, on which a plurality of transforming stations are arranged for transforming plastic parisons into plastic containers, and these transforming stations each have at least two mould supports on which blow mould parts are arranged, wherein these blow mould parts are components of a blow mould and form a hollow space within which the plastic parisons can be expanded into the plastic containers by application of a flowable medium and wherein these two mould supports are pivotable with respect to one another for opening and closing the blow mould and wherein the transforming stations have a latching mechanism which is configured to latch the two mould supports at least at times to one another in such a way that an opening movement of the blow mould is prevented, wherein a changing operation of the apparatus is provided, in which at least components of the blow mould are changed and a first actuating device is provided, which effects a latching and/or unlatching of the latching mechanism before or while a changing operation is carried out, and a second actuating device is provided which brings the mould support into an open and/or closed position, wherein in the changing operation of the apparatus the latching mechanism can be unlatched or latched by a movement of the transforming station relative to the actuating device and/or the mould support can be brought into an open and/or closed position by a movement of the transforming station relative to the actuating device, and, wherein the apparatus has, a changing device which is configured to demount blow mould parts from the blow mould support parts.

15. The apparatus according to claim 14. wherein the actuating device has an actuating element which effects an unlatching of the latching mechanism by mechanical contact with at least one element of the transforming station.

16. The apparatus according to claim 15, wherein this actuating element is movable between at least two positions.

17. The apparatus according to claim 15, wherein in or after
the changing operation of the apparatus the latching mechanism can be latched again by movement of the transforming station relative to the actuating device.

18. The apparatus according to claim 15, wherein the actuating element is configured in such a way that it also effects latching of the latching mechanism by mechanical contact with the element of the transforming station.

* * * * *

UNITED STATES PATENT AND TRADEMARK OFFICE
CERTIFICATE OF CORRECTION

PATENT NO. : 11,433,569 B2  
APPLICATION NO. : 16/611166  
DATED : September 6, 2022  
INVENTOR(S) : Hack et al.

Page 1 of 1

It is certified that error appears in the above-identified patent and that said Letters Patent is hereby corrected as shown below:

In the Claims

Claim 6, Column 12, Line 5, "to claim, wherein" should be --to claim 1, wherein--.

Signed and Sealed this  
Eighth Day of October, 2024

Katherine Kelly Vidal  
*Director of the United States Patent and Trademark Office*